United States Patent
Chen et al.

(10) Patent No.: US 10,471,625 B2
(45) Date of Patent: Nov. 12, 2019

(54) TREATED POROUS MATERIAL

(71) Applicant: Dow Global Technologies LLC, Midland, MI (US)

(72) Inventors: Xue Chen, Manvel, TX (US); Stephen W. King, League City, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 355 days.

(21) Appl. No.: 15/537,246

(22) PCT Filed: Jun. 30, 2015

(86) PCT No.: PCT/US2015/038475
§ 371 (c)(1),
(2) Date: Jun. 16, 2017

(87) PCT Pub. No.: WO2016/105596
PCT Pub. Date: Jun. 30, 2016

(65) Prior Publication Data
US 2017/0348871 A1 Dec. 7, 2017

Related U.S. Application Data

(60) Provisional application No. 62/096,052, filed on Dec. 23, 2014.

(51) Int. Cl.
B27K 3/15 (2006.01)
C08L 63/00 (2006.01)
C08L 97/02 (2006.01)
C08K 5/00 (2006.01)
C08L 63/04 (2006.01)

(52) U.S. Cl.
CPC ............... B27K 3/15 (2013.01); C08L 63/00 (2013.01); C08L 97/02 (2013.01); C08K 5/0025 (2013.01); C08L 63/04 (2013.01); C08L 2201/50 (2013.01)

(58) Field of Classification Search
CPC ...................................................... B27K 3/15
See application file for complete search history.

(56) References Cited

U.S. PATENT DOCUMENTS

| | | | | |
|---|---|---|---|---|
| 1,996,567 A * | 4/1935 | Butterworth | ............. | B27K 3/52 427/416 |
| 2,867,543 A * | 1/1959 | Braun, Jr. | ................ | B27K 3/08 427/227 |
| 3,077,420 A * | 2/1963 | Kenaga | .................... | B27K 3/15 427/499 |
| 3,243,140 A * | 3/1966 | Bliven | ................. | B27K 3/0214 242/118.32 |
| 3,272,676 A * | 9/1966 | Kigane | ................... | B29C 70/16 156/315 |
| 3,616,028 A * | 10/1971 | Miller | .................... | B44C 1/1712 156/275.5 |
| 3,649,442 A * | 3/1972 | Kenaga | .................... | B27K 3/15 428/414 |
| 5,273,787 A | 12/1993 | Gnatowski | | |
| 8,173,726 B2 | 5/2012 | Heuts et al. | | |
| 8,304,087 B2 | 11/2012 | Perrier et al. | | |
| 2008/0020087 A1* | 1/2008 | Landers | ................. | A01N 35/06 426/3 |
| 2008/0193785 A1* | 8/2008 | Kingma | .................... | B05D 7/08 428/541 |
| 2009/0317626 A1 | 12/2009 | Tiarks et al. | | |
| 2010/0092782 A1* | 4/2010 | Perrier | ................. | B27K 3/0292 428/413 |
| 2010/0119858 A1* | 5/2010 | Benkhoff | ................. | B05D 7/06 428/537.1 |
| 2010/0168379 A1* | 7/2010 | Krafft | ................. | C07D 301/28 528/397 |
| 2011/0159301 A1* | 6/2011 | Wakamatsu | ............. | B27K 3/15 428/447 |
| 2012/0148857 A1* | 6/2012 | Smith | .................... | B27K 3/163 428/537.1 |

FOREIGN PATENT DOCUMENTS

| | | |
|---|---|---|
| EP | 1950261 | 7/2008 |
| WO | 2009047551 | 4/2009 |
| WO | 2013043363 A2 | 3/2013 |
| WO | 2014004358 | 1/2014 |

* cited by examiner

Primary Examiner — Cachet I Proctor

(57) ABSTRACT

A treated cellulosic material comprising a cellulosic material having a porous structure defining a plurality of pores, at least a portion of the pores containing a treating agent comprising a thermoset comprising a cured epoxy resin. The present disclosure further describes a method for preparing a treated cellulosic material comprising (a) providing a cellulosic material; and (b) a first treatment protocol comprising impregnating the cellulosic material with an aqueous dispersion, the aqueous dispersion comprising an epoxy resin and an emulsifying agent.

6 Claims, No Drawings

TREATED POROUS MATERIAL

BACKGROUND OF THE INVENTION

Porous materials, such as cellulosic materials, need to be protected from mold growth, insect attack, rot and water impregnation to help preserve the physical properties of the cellulosic material. One example of such a cellulosic material is wood. A variety of treatment agents and preservation methods are known to preserve cellulosic materials.

Modern preservation methods typically involve pressure treating the cellulosic material with a treating agent. Pressure treatment typically allows the treating agent to penetrate throughout the porous structure of the cellulosic material. The treating agent is typically a chemical compound selected to impart the desired physical properties to the cellulosic material. For example, treating agents that add water resistance and improve the dimensional stability of the cellulosic material are of interest. Wood is capable of absorbing as much as 100% of its weight in water which causes the wood to swell, which after loss of water through evaporation causes the wood to shrink. This process of water absorption/evaporation is non-uniform and creates internal stresses in the wood leading to splitting, warping, bowing, crooking, twisting, cupping, etc. Also, water can serve as a pathway for organisms that degrade the cellulosic material, such as insects or fungus.

Termites are one of the most significant insect groups responsible for wood damage. In order to mitigate termite damage, the use of naturally durable wood species, preservative treatments, and engineered wood products have been employed. However, the need for improved technologies for termite resistance are desirable due to the limited availability of durable woods, the high percentage weight gains required for preservatives to provide efficacy, and the "unnatural" look of engineered wood. A technology which is provides termite resistance and dimensional stability to wood is highly desirable.

Treating agents that repel insects, or minimize the formation of fungi/molds, or improve the overall durability of the cellulosic material are of interest. Further, treating agents can improve wind resistance, ultraviolet radiation resistance, stability at high and low temperatures, pest resistance, mold resistance, fire resistance and other issues which might affect the physical properties of the cellulosic material.

An improved treating agent for cellulosic materials is desired.

SUMMARY OF THE INVENTION

The present disclosure describes a treated cellulosic material comprising a cellulosic material having a porous structure defining a plurality of pores, at least a portion of the pores containing a treating agent comprising a thermoset comprising a cured epoxy resin.

The present disclosure further describes a method for preparing a treated cellulosic material comprising (a) providing a cellulosic material; and (b) a first treatment protocol comprising impregnating the cellulosic material with an aqueous dispersion, the aqueous dispersion comprising an epoxy resin and an emulsifying agent.

DETAILED DESCRIPTION OF THE INVENTION

As used herein, the term "porous material" refers to a material which is permeable such that fluids are movable therethrough by way of pores or other passages. Examples of porous materials include cellulosic material, stone, concrete, ceramics, and derivatives thereof. As used herein, the term "cellulosic material" refers to a material that includes cellulose as a structural component. Examples of cellulosic materials include wood, paper, textiles, rope, particleboard and other biologic and synthetic materials. As used herein, the term "wood" includes solid wood and all wood composite materials, e.g., chipboard, engineered wood products, etc. Cellulosic materials generally have a porous structure that defines a plurality of pores.

A "treated cellulosic material" is a cellulosic material that has been treated with a treating agent to modify the properties of the cellulosic material. The properties modified by the treating agent may include, but are not limited to, increased hydrophobicity, dimensional stability, fungi resistance, mold resistance, insect resistance, hardness, surface appearance, UV stability, fire resistance, and coatability. Increasing the hydrophobicity of a cellulosic material can provide other ancillary benefits by reducing the rate of water adsorption and evaporation, thus reducing the internal stresses of expanding and contracting.

A "treating agent" is a substance that, when combined with the cellulosic material, modifies the properties of the cellulosic material. In one instance, the treating agent comprises a thermoset. A dispersion is applied to the cellulosic material as described herein, in which the dispersion contains the precursor to the treating agent. As is described in greater detail here, in one instance the dispersion contains an epoxy resin, which epoxy resin is a precursor to the thermoset. The dispersion is applied to the cellulosic material. One method of applying the dispersion to the cellulosic material is through impregnation using pressure treatment. Other methods of applying the dispersion are known, such as brushing, coating, spraying, dipping, soaking and extrusion. Once applied, the dispersion will permeate at least a portion of the pores of the cellulosic material.

As used herein, "thermoset" refers to the treating agent impregnated in the cellulosic material. The thermoset is preferably a cured or hardened epoxy resin. As used herein "cured" and "hardened" are used interchangeably to refer to an epoxy resin which has at least partially reacted to form a thermoset. As is discussed in greater detail herein, the epoxy resin is a component part of the dispersion. As such, reference herein to "thermoset" refers to the epoxy resin which has been at least partially polymerized following impregnation in the cellulosic material. Similarly, reference herein to "epoxy" or "epoxy resin" refers to material from which the thermoset is prepared.

In one instance, the epoxy resin comprises an aromatic or aliphatic glycidyl ether, a cycloaliphatic epoxy resin, a bisphenol F epoxy resin, a novolac epoxy resin, a glycidylamine-based epoxy resin, an alicyclic epoxy resin, a linear aliphatic epoxy resin, a tetrabromobisphenol A epoxy resin, polyglycidyl ethers of polyhydric alcohols, polyglycidyl ethers of polyhydric phenols, polyglycidyl amides, polyglycidyl imides, polyglycidyl hydantoins, polyglycidyl thioethers, epoxidized fatty acids, epoxidized drying oils, epoxidized polyolefins, epoxidized di-unsaturated acid esters, epoxidized unsaturated polyesters, a bisphenol A diglycidyl ether, a bisphenol F diglycidyl ether, a resorcinol diglycidyl ether, triglycidyl ethers of para-aminophenols, reaction products of epichlorohydrin with o-cresol, phenol novolacs, or mixtures thereof.

In one instance, the thermoset is prepared from an epoxy resin in a dispersion stabilized by an emulsifying agent. The dispersion is preferably an aqueous dispersion. The epoxy resin may be a solid epoxy resin or a liquid epoxy resin. In one instance the dispersion includes water, an epoxy resin, and one or more emulsifying agents. The aqueous dispersion is preferably a stable dispersion. A stable dispersion is a dispersion that, once formed, resists change in its properties over time and is therefore suitable for penetrating the pores of the cellulosic material. In one instance, the dispersion is substantially solvent-free, for example, having less than 1% by volume solvent. In one instance the aqueous dispersion has less than 0.1% by volume solvent. In one instance, the dispersion is solvent-free. Examples of the dispersion which are available commercially include OUDRAsperse™, available from The Dow Chemical Company, e.g., OUDRASperse™ WB 3001, OUDRASperse™ WB 4001, OUDRASperse™ WB 6001.

In one instance, the emulsifying agent is a surfactant. In one instance the surfactant is nonionic, or anionic. In one instance the surfactant is an epoxy functional surfactant. An epoxy functional surfactant is a surfactant that contains a functionality that reacts with an epoxy containing material to become an integral part of the cured matrix. In one embodiment the surfactant is treated with an epihalohydrin or a multifunctional (di or higher) epoxide to give the epoxy functional surfactant. In one preferred embodiment the surfactant treated with an epihalohydrin or a multifunctional (di or higher) epoxide is nonionic. Examples of nonionic surfactants include alkoxylated alcohols alkoxylated alkyl phenols, alkoxylated esters, alkoxylated acid esters, ethyleneoxide/propylene oxide copolymers (block and random), amine alkoxylates, alkoxylated polyols, and thiols. In one instance the dispersion includes a combination of epoxy functional surfactants. In another instance the dispersion includes a combination of an epoxy functional surfactant and another surfactant.

In one instance the emulsifying agent is a water soluble polymeric emulsifying agent. Emulsifying agents suitable for use include conventional anionic and non-ionic emulsifiers and any practical combinations thereof. The emulsifying agent is employed in forming the aqueous dispersion. Specifically, the emulsifying agent (a) helps match the viscosity of the aqueous and resin phases, thereby facilitating energy-efficient mixing of such phases; (b) reduces the interfacial tension thereby also reducing the mixing energy required in the initial process step and (c) helps stabilize the aqueous dispersion. Selection of a suitable emulsifying agent for performing such functions for a particular resin is made pursuant to conventional considerations such as compatibility (e.g., interfacial tension), and ability to impart stability to the finished dispersion.

Examples of suitable emulsifying agents include polyvinyl alcohol (preferably having a molecular weight of at least about 50,000, especially of at least about 100,000); partially hydrolyzed (e.g., from about 85 to about 99 percent hydrolyzed) polyvinyl acetate (preferably having a molecular weight of at least about 50,000, especially of at least about 100,000); block copolymers of ethylene oxide and propylene oxide (such as those of the "Pluronic" trade name series and marketed by BASF Wyandotte, Industrial Chemical Division); natural products such as gum arabic, gum tragacanth, starches, etc.; the polymer of methyl vinyl ether; polyvinyl pyrrolidone; vinyl type copolymers of monomeric acids such as acrylic acid, methacrylic acid, maleic anhydride, crotonic acid with copolymerizable monomers such as vinyl acetate, styrene, ethylene, propylene, etc.; and the like.

The stable aqueous dispersion is prepared such that the suspended particle size in the dispersion is suitable for penetrating the pores of the cellulosic material for distribution through the cellulosic material. In one instance, the dispersion also comprises one or more additives. In one instance, any solids present in the stable aqueous dispersion are held in a stable suspension and are transportable by the dispersion into the pores of the cellulosic material. In one instance, the solids content of the dispersion is 1 to 75 weight percent.

The "modifying agent" is a substance that, when combined with the epoxy resin, polymerizes and/or crosslinks and/or cures at least a portion of the epoxy resin. The modifying agent is preferably an agent which is known to cure and/or crosslink epoxy resins. In one instance, the modifying agent is a catalyst that cures the epoxy resin. In one instance, the modifying agent is a curing hardener. Examples of the modifying agent include, polyfunctional alcohols, phenols, cycloaliphatic carboxylic acids, aromatic amines, aliphatic amines and aminophenols reacted with epichlorohydrin. In one instance, the emulsifying agent polymerizes and/or crosslinks and/or reacts at least a portion of the epoxy resin.

The treating agent is combined with the cellulosic material. In one instance, the treating agent is introduced to the cellulosic material as the epoxy by pressure treatment, as described herein. In another instance, the treating agent is introduced to the cellulosic material as the epoxy by other techniques known in the art, for example, brushing, coating, dipping, soaking, spraying, and extrusion. The treating agent becomes impregnated in at least a portion of the pores of the cellulosic material, and thereby increases the weight of the cellulosic material. In one instance, the thermoset increases the weight of the cellulosic material by 1 to 80 percent (as compared to the original weight of the cellulosic material and as calculated after drying the cellulosic material for at least 2 hours at or above 60° C.). In one instance, the treating agent increases the weight of the cellulosic material by 5 to greater than 100 percent (as calculated after drying the cellulosic material for at least 2 hours at or above 60° C.).

In one instance, one or more additives are impregnated in the cellulosic material. The additive may be introduced as part of the dispersion, as part of the modifying agent, or may be included separately therefrom. Additives which are known to add properties to treated cellulosic materials are suitable, such as, flame retardants, dispersants and/or dyes. The additives may also include nanofillers which are known to be compatible with epoxy dispersions. For example, the additives may be organic compounds, metallic compounds, or organometallic compounds. In one instance, the additive is a material which improves the wetting or penetration of the dispersion into the wood, for example, solvents or surfactants (anionic, cationic or nonionic) that are stable in the dispersion. Examples of additives include solvents, fillers, thickeners, emulsifiers, dispersing agents, buffers, pigments, penetrants, antistatic agents, odor substances, corrosion inhibitors, preservatives, siliconizing agents, rheology modifiers, anti-settling agents, anti-oxidants, other crosslinkers (e.g. diols and polyols), optical brighteners, waxes, coalescence agents, biocides and anti-foaming agents. Such waxes may include petroleum waxes, paraffin waxes, a natural wax, or a synthetic wax such as polyethylene wax or oxidized polyethylene wax, beeswax, or slack wax. In addition, the additive may be a wood preservatives containing, for example, cupric-ammonia, cupric-amine, cupric-ammonia-amine complexes, quaternary ammonium compounds, or other systems. For example, Alkaline Copper-Quaternary ammonium (ACQ) preservative systems. The additive may include wood preservative technologies which use zinc salts or boron containing compounds.

Optionally, other additives such as insecticides, termiticides, fungicides, and moldicides may be added to the cellulosic material. In one instance, the additive is included as part of the dispersion and forms a stable suspension therewith. In one instance, one or more surfactant is added to the dispersion. In one instance, a surfactant is selected which increases the amount of dispersion impregnated in the cellulosic material. For example, suitable surfactants may be nonionic or anionic. Examples of nonionic surfactants include: alkoxylated alcohols, alkoxylated alkyl phenols, fatty acid esters, amine and amide derivatives, alkylpolyglucosides, ethylene oxide/propylene oxide copolymers, polyols, and alkoxylated polyols. For example, a nonionic surfactant is TERGITOL™ L-62, commercially available from The Dow Chemical Company. Examples of anionic surfactants include: alkyl sulfates, alkyether sulfates, sulfated alkanolamides, alpha olefin sulfonates, lignosulfonates, sulfosuccinates, fatty acid salts, and phosphate esters.

In one instance the dispersion constituents have a sufficiently small particle size to penetrate the pores of the cellulosic material. In one instance, the dispersion constituents have a particle size no greater than 50 μm. In one instance, the dispersion constituents have a particle size no greater than 5 μm. In one instance, the dispersion constituents have a particle size less than 0.5 μm.

In one instance, the cellulosic material is prepared as a treated cellulosic material by pressure treatment. The pressure used to pressure treat the cellulosic material may be either higher or lower than atmospheric pressure. In one instance, the pressure is lower than ambient pressure, for example, 0.0001 to 0.09 MPa (0.75 to 675 mmHg). In another instance, the pressure is greater than ambient pressure, for example, 0.1 to 1.7 MPa (750 to 12750 mmHg). It is envisioned that pressure treatment processes known in the art are suitable for impregnating the cellulosic material with the treating agent.

In one instance, the treated cellulosic material is prepared according to at least a first treatment protocol and a second treatment protocol. In one instance, the first treatment protocol comprises impregnating the cellulosic material with the epoxy resin. The first treatment protocol comprises one or more of the following steps: (a) depositing the cellulosic material in a vessel; (b) holding the vessel at vacuum for 5 to 60 minutes; (c) introducing the epoxy to the vessel; (d) pressurizing the vessel to 1.03 MPa for 5 to 60 minutes; (e) draining the excess epoxy; (f) optionally removing excess epoxy by vacuum; and (g) air drying the cellulosic material at 20 to 60° C. for 24 to 48 hours. In one instance, the epoxy is part of the stable aqueous dispersion. In one instance, the epoxy resin of step (c) is introduced as a component part of a dispersion.

In one instance, the product of the first treatment protocol is subsequently prepared according to a second treatment protocol that impregnates the cellulosic material with the modifying agent. The second treatment protocol comprises one or more of the following steps: (a) depositing the cellulosic material prepared according to the first treatment protocol in a vessel; (b) introducing the modifying agent to the vessel; (c) holding the vessel at either vacuum or increased pressure for 5 to 60 minutes; (d) optionally removing excess modifying agent by vacuum; and (e) air drying the cellulosic material at 60° C. for 24 to 48 hours.

The designations "first treatment protocol" and "second treatment protocol" are not meant to be read as defining a treatment order. It is envisioned that the cellulosic material may be treated first with the dispersion and second treated with the modifying agent, whereby the second treatment follows the first treatment in time. It is also envisioned that the cellulosic material may be treated first with the modifying agent and second treated with the dispersion, whereby the second treatment protocol precedes the first treatment protocol in time. It is also envisioned that the cellulosic material may be treated simultaneously with the first treatment protocol and the second treatment protocol (in which case the cellulosic material should be treated promptly after combining the dispersion and the modifying agent to minimize the curing reaction).

The several drying steps may be performed at a range of temperatures, whereby the duration of the drying step is proportional to the temperature. Suitable drying temperatures are between room temperature (roughly 20° C.) and 180° C. The drying may be performed in air, in nitrogen, or other suitable atmosphere.

In one instance, second treatment protocol comprises a heating protocol, where the product of the first treatment protocol is heated in air at 80° C. for 1 to 7 days. Without being limited by theory, it is expected that the combination of high temperatures and the natural components of the porous material encourage the epoxy to polymerize and crosslink.

A water immersion test is used to determine the water repellency of the treated cellulosic material according to the American Wood Protection Association Standard E4-11 procedure (Standard Method of Testing Water Repellency of Pressure Treated Wood). The water immersion test involves first, providing both a treated wafer, comprising a treated cellulosic material prepared as described herein, and a control wafer, comprising an untreated cellulosic material; second, measuring the tangential dimension of both the treated wafer and the control wafer to provide an initial tangential dimension ($T_1$) (where the tangential dimension is perpendicular to the direction of the grain of the cellulosic material); third, placing both the treated wafer and the control wafer in a conditioning chamber maintained at 65±3% relative humidity and 21±3° C. until a constant weight is achieved; fourth, immersing both the treated wafer and the control wafer in distilled water at 24±3° C. for 30 minutes; and fourth, measuring the tangential dimension of both the treated wafer and the control wafer following removal from the water to provide a post tangential dimension ($T_2$).

The percent swelling (S) for each individual wafer (both the treated wafer and the control wafer) is calculated as:

$$S(\%) = \frac{T_2 - T_1}{T_1} \times 100$$

In each of the Examples herein, the percent swelling of the control wafer is 4.7%.

Water-repellency efficiency (WRE) is used to determine the effectiveness of the treating agent in adding water repellant properties to the treated cellulosic material. WRE is calculated as:

$$WRE(\%) = \frac{S_1 - S_2}{S_1} \times 100$$

$S_1$ refers to the percent swelling of the untreated wafer; $S_2$ refers to the percent swelling of the treated wafer. According to E4-11, for most outdoor applications a minimum WRE of 75% is preferred. The WRE of the control wafer is 0%.

The hardness of the treated cellulosic material is determined according to the Shore (Durometer) test using a Type D Durometer (30° cone, 1.40 mm diameter, 2.54 mm extension, 44.48N spring force). Hardness is determined using the Type D Durometer by placing the cellulosic material on a hard flat surface, and the foot of the durometer is pressed with the given spring force against the cellulosic material. The hardness value is recorded from the gauge on the Durometer within one second of contact with the cellulosic material. At least five hardness tests were performed per sample of cellulosic material. Hardness values reported herein are averages of the tests performed for a given cellulosic material. The hardness value of an untreated southern yellow pine control wafer is approximately 40.

The following Examples illustrate certain aspects of the present disclosure, but the scope of the present disclosure is not limited to the following Examples.

Example 1

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 45 percent by weight (solid concentration) OudraSperse™ WB 3001 waterborne epoxy dispersion (available from The Dow Chemical Company) and 55 percent by weight water is introduced to the reactor. The reactor pressure is then set to 1.03 MPa for 60 minutes under nitrogen. The wafer is then placed in an oven and dried in air at 80° C. for 1 week. The treated wafer and a control wafer are each processed according to the E4-11 procedure. The percent swelling for the treated wafer is 0.43%; the WRE of the treated wafer is 90.0%. The hardness of the treated wafer is measured as 50 using a Type D Durometer.

Example 2

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 30 percent by weight (solid concentration) OudraSperse™ WB 3001 waterborne epoxy dispersion (available from The Dow Chemical Company) and 70 percent by weight water is introduced to the reactor. The reactor pressure is then set to 1.03 MPa for 60 minutes under nitrogen. The wafer is then placed in an oven and dried in air at 80° C. for 1 week. The treated wafer and a control wafer are each processed according to the E4-11 procedure. The percent swelling for the treated wafer is 1.47%; the WRE of the treated wafer is 68.7%. The hardness of the treated wafer is measured as 45 using a Type D Durometer.

Example 3

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 20 percent by weight (solid concentration) OudraSperse™ WB 3001 waterborne epoxy dispersion (available from The Dow Chemical Company) and 80 percent by weight water is introduced to the reactor. The reactor pressure is then set to 1.03 MPa for 60 minutes under nitrogen. The wafer is then placed in an oven and dried in air at 80° C. for 1 week. The treated wafer and a control wafer are each processed according to the E4-11 procedure. The percent swelling for the treated wafer is 3.2%; the WRE of the treated wafer is 32.7%. The hardness of the treated wafer is measured as 42 using a Type D Durometer.

Example 4

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 12 percent by weight (solid concentration) OudraSperse™ WB 3001 waterborne epoxy dispersion (available from The Dow Chemical Company) and 88 percent by weight water is introduced to the reactor. The reactor pressure is then set to 1.03 MPa for 60 minutes under nitrogen. The wafer is then placed in an oven and dried in air at 80° C. for 1 week. The treated wafer and a control wafer are each processed according to the E4-11 procedure. The percent swelling for the treated wafer is 4.4%; the WRE of the treated wafer is 5.2%. The hardness of the treated wafer is measured as 47 using a Type D Durometer.

The Examples illustrate that when the cellulosic material is treated with the treating agent, favorable WRE results are obtained. As the results show, better WRE results are obtained at the higher concentrations of the waterborne epoxy.

What is claimed is:

1. A method for preparing a treated cellulosic material comprising:
    (a) providing a cellulosic material;
    (b) a first treatment protocol comprising impregnating the cellulosic material with an aqueous dispersion, the aqueous dispersion comprising an epoxy resin and an emulsifying agent; and
    (c) a second treatment protocol comprising impregnating the cellulosic material with a modifying agent, the modifying agent comprising a curing agent and/or a catalyst suitable for curing the epoxy resin.

2. The method of claim 1, wherein the impregnation of the first treatment protocol is conducted under a pressure that is greater than or lower than ambient.

3. The method of claim 1, wherein the epoxy resin comprises, an aromatic or aliphatic glycidyl ether, a cycloaliphatic epoxy resin, a bisphenol F epoxy resin, a novolac epoxy resin, a glycidylamine-based epoxy resin, an alicyclic epoxy resin, a linear aliphatic epoxy resin, a tetrabromobisphenol A epoxy resin, polyglycidyl ethers of polyhydric alcohols, polyglycidyl ethers of polyhydric phenols, polyglycidyl amides, polyglycidyl imides, polyglycidyl hydantoins, polyglycidyl thioethers, epoxidized fatty acids, epoxidized drying oils, epoxidized polyolefins, epoxidized di-unsaturated acid esters, epoxidized unsaturated polyesters, a bisphenol A diglycidyl ether, a bisphenol F diglycidyl ether, a resorcinol diglycidyl ether, triglycidyl ethers of para-aminophenols, reaction products of epichlorohydrin with o-cresol, phenol novolacs, or mixtures thereof.

4. The method of claim 1, wherein the modifying agent comprises a polyfunctional alcohol, a phenol, a cycloaliphatic carboxylic acid, an aromatic amine, or an aminophenol reacted with epichlorohydrin.

5. The method of claim 1, wherein the emulsifying agent comprises a surfactant.

6. The method of claim 5, wherein the surfactant comprises an epoxy functional surfactant, a nonionic surfactant, an anionic surfactant or a mixture thereof.

* * * * *